United States Patent
Edelman et al.

(10) Patent No.: US 9,142,232 B2
(45) Date of Patent: Sep. 22, 2015

(54) MAGNETIC STACK WITH SEPARATED CONTACTS

(75) Inventors: Harry Sam Edelman, Minneapolis, MN (US); Victor Boris Sapozhnikov, Minnetonka, MN (US); Mohammed Shariat Ullah Patwari, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 53 days.

(21) Appl. No.: 13/591,862

(22) Filed: Aug. 22, 2012

(65) Prior Publication Data

US 2014/0055884 A1 Feb. 27, 2014

(51) Int. Cl.
G11B 5/39 (2006.01)
G11B 5/11 (2006.01)
G11B 5/48 (2006.01)

(52) U.S. Cl.
CPC ............ G11B 5/3977 (2013.01); G11B 5/4886 (2013.01); *G11B 5/3912* (2013.01); *G11B 5/3932* (2013.01)

(58) Field of Classification Search
CPC ........... G11B 5/3929; G11B 5/10; G11B 5/11
USPC ................................. 360/319, 128
See application file for complete search history.

(56) References Cited

U.S. PATENT DOCUMENTS

| | | | |
|---|---|---|---|
| 4,972,336 A | 11/1990 | Reid et al. | |
| 6,104,562 A | 8/2000 | Otteson et al. | |
| 6,271,998 B1 * | 8/2001 | Coehoorn et al. | 360/324.2 |
| 6,512,263 B1 | 1/2003 | Yuan et al. | |
| 6,826,140 B2 | 11/2004 | Brommer et al. | |
| 6,839,202 B2 | 1/2005 | Zhou | |
| 7,027,268 B1 * | 4/2006 | Zhu et al. | 360/314 |
| 7,042,683 B1 | 5/2006 | Cross et al. | |
| 7,126,890 B2 | 10/2006 | Learned et al. | |
| 7,567,397 B2 | 7/2009 | Lu | |
| 7,636,219 B2 | 12/2009 | Ikegami et al. | |
| 7,813,066 B2 | 10/2010 | Nakagawa et al. | |
| 8,035,910 B2 | 10/2011 | Mallary et al. | |
| 2005/0036437 A1 | 2/2005 | Learned et al. | |
| 2005/0280952 A1 * | 12/2005 | Kondo et al. | 360/322 |
| 2006/0002034 A1 * | 1/2006 | Li et al. | 360/324.1 |
| 2007/0019335 A1 | 1/2007 | McFadyen | |
| 2007/0201160 A1 | 8/2007 | Albrecht et al. | |
| 2009/0260719 A1 | 10/2009 | Iben | |
| 2009/0279213 A1 | 11/2009 | Wu et al. | |
| 2009/0310248 A1 | 12/2009 | Hachisuka | |
| 2010/0110582 A1 * | 5/2010 | Hachisuka | 360/319 |
| 2010/0328799 A1 * | 12/2010 | Braganca et al. | 360/324.12 |
| 2011/0007431 A1 * | 1/2011 | Braganca et al. | 360/324.12 |
| 2011/0069413 A1 * | 3/2011 | Maat et al. | 360/324 |
| 2011/0141629 A1 * | 6/2011 | Braganca et al. | 360/313 |
| 2013/0003228 A1 * | 1/2013 | Sapozhnikov | 360/313 |
| 2013/0286511 A1 * | 10/2013 | Edelman et al. | 360/128 |

FOREIGN PATENT DOCUMENTS

| | | |
|---|---|---|
| JP | 2004-510326 A | 4/2004 |
| JP | 2011-070759 A | 4/2011 |
| JP | 2011-124574 A | 6/2011 |

* cited by examiner

*Primary Examiner* — Craig A. Renner
(74) *Attorney, Agent, or Firm* — Hall Estill Attorneys at Law

(57) ABSTRACT

An apparatus for two dimensional reading may be constructed, in accordance with some embodiments, with a number of magnetic stacks respectively configured to engage adjacent data tracks of a data storage media. Each magnetic stack can be disposed between top and bottom shields while each shield is segmented into a number of contacts different than the number of magnetic stacks.

19 Claims, 5 Drawing Sheets

FIG. 5
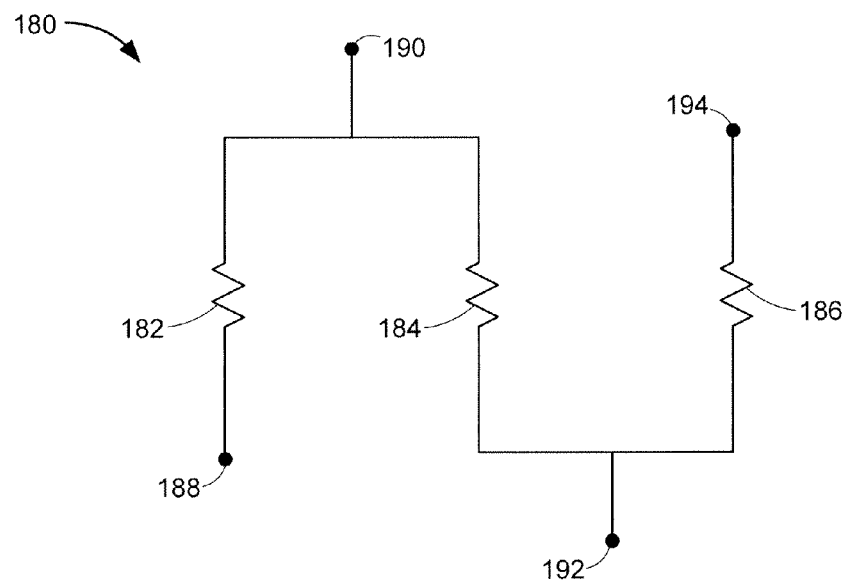
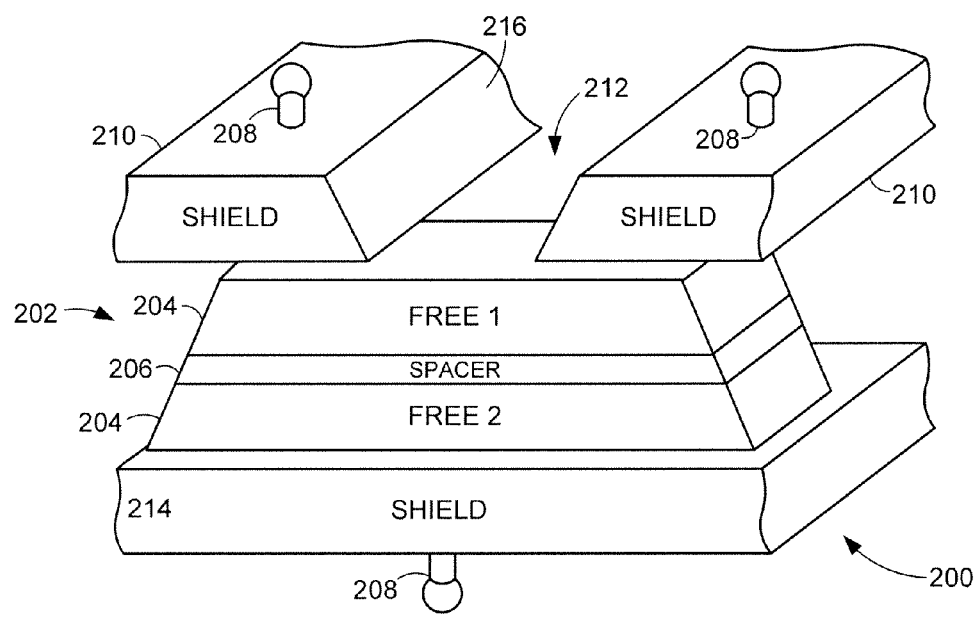
FIG. 6

MAGNETIC STACK WITH SEPARATED CONTACTS

SUMMARY

Various embodiments of the present disclosure are generally directed to a magnetic sensor that is capable of two dimensional data sensing.

In accordance with some embodiments, a number of magnetic stacks can respectively be configured to engage adjacent data tracks of a data storage media. Each magnetic stack can be disposed between top and bottom shields while each shield is segmented into a number of contacts is different than the number of magnetic stacks.

BRIEF DESCRIPTION OF THE DRAWINGS

FIG. 5 illustrates an isometric view of a portion of an example magnetic element constructed in accordance with various embodiments.

FIG. 6 shows a top view of an example two dimensional data read sensor constructed capable of being used in the data storage device of FIG. 1.

DETAILED DESCRIPTION

Emerging aspects of the data storage industry has continually strived for devices with higher data capacity and faster data access. As data tracks of a rotating recording media become smaller to accommodate greater data capacity, data reading and programming errors, such as side track reading and interference, can detrimentally affect signal fidelity. The use of two dimensional magnetic recording (TDMR) that employs multiple data track encoding that is subsequently decoded by reading multiple data tracks can restore signal fidelity without extra data media revolutions. However, smaller form factor data storage devices have placed increased emphasis on providing multiple data sensors with precise alignment and interconnections. Hence, industry is striving to provide a two dimensional data sensor with accurate alignment and interconnections capable of being constructed in reduced form factors.

Accordingly, a number of magnetic stacks may respectively be configured to engage adjacent data tracks of a data storage media with each magnetic stack disposed between a top and bottom shield while at least one shield is segmented into a number of contacts less than the number of magnetic stacks. Such contact configuration can be adapted so that the contacts are electrically separated to allow two dimensional data sensing. The reduction of electrical contacts allows for decreased manufacturing time and precision, especially in reduced form factor environments, as the contacts span multiple magnetic stacks and have fewer electrically isolating gaps.

Figure 1:
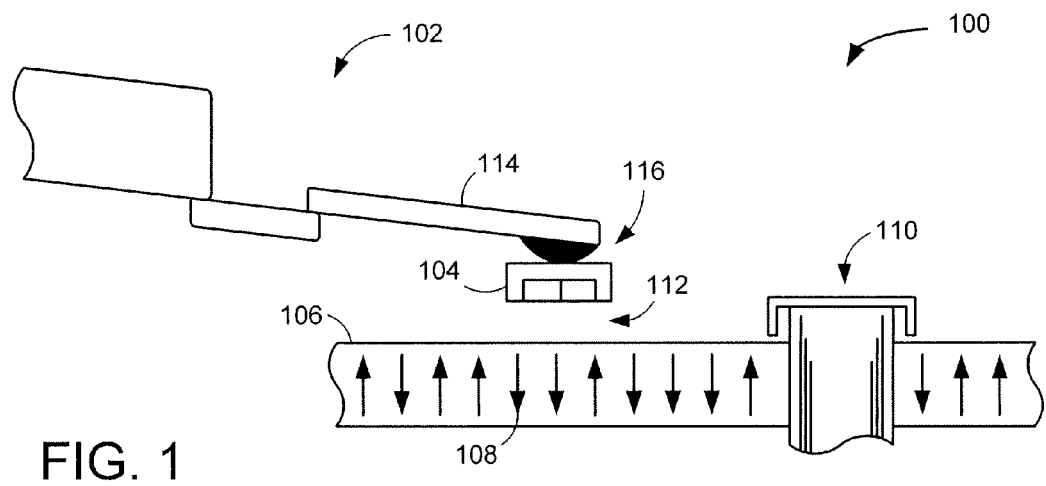
FIG. 1 is a block representation of an example portion of a data storage device.

While multiple data sensors can be utilized to read and write data in a variety of data storage environments, FIG. 1 generally illustrates an example data transducing portion 100 of a data storage device. The transducing portion 100 is shown in an environment in which various embodiments can be practiced. It will be understood, however, that the various embodiments of this disclosure are not so limited by such environment and can be implemented to perform two dimensional data access with multiple data sensors.

The transducing portion 100 of a data storage device shown in FIG. 1 has an actuating assembly 102 that positions a transducing head 104 over programmed data bits 106 present on a magnetic storage media 108. The storage media 108 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 108.

The transducing head 104 can include one or more transducing elements, such as a magnetic writer and/or magnetically responsive reader, which operate to program and read data from the storage media 108, respectively. In this way, controlled motion of the actuating assembly 102 induces the transducers to align with data tracks (not shown) defined on the storage media surfaces to write, read, and rewrite data.

Figure 2:
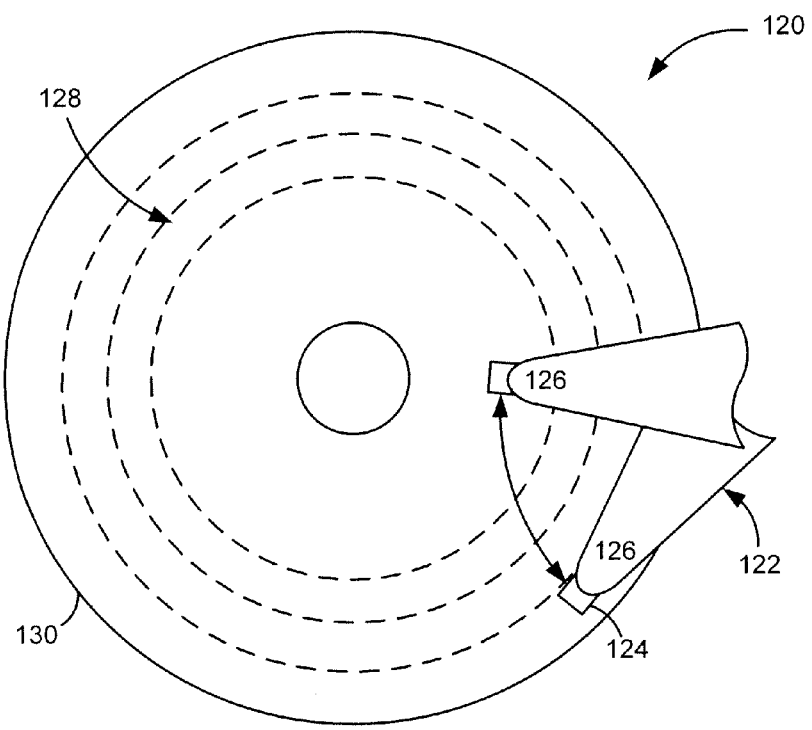
FIG. 2 provides a top view block representation of a portion of the data storage device displayed in FIG. 1 according to an embodiment.

FIG. 2 displays a top view block representation of a data sensing assembly 120 cable of being used in the transducing portion 100 of FIG. 1. An actuating portion 122 of the data transducing assembly 120 are configured with at least a slider 124 and load beam 126 that articulate to provide access to various data tracks 128 of a data storage media 130. As shown, rotation of the actuating portion 122 can modify the angular orientation of the slider 124 in relation to the data tracks 128 in what can be called the skew angle of the portion 122.

As data tracks 128 get smaller with increased data storage capacity, the precision of aligning multiple data sensors on the slider 124 is placed at a premium. The alignment of multiple data sensors is further stressed with two dimensional data access where data sensors simultaneously read data from adjacent data tracks 128 involving different skew angles. That is, smaller data tracks 128 combined with increased slider 124 girth due to multiple transducing elements being present can result in misalignment of the data tracks 128 and slider 124 for various skew angles. Hence, constructing a slider 124 with multiple data transducing elements as small as possible allows for use in reduced form factor environments, but poses an increased difficulty in data sensor alignment.

Figure 3:
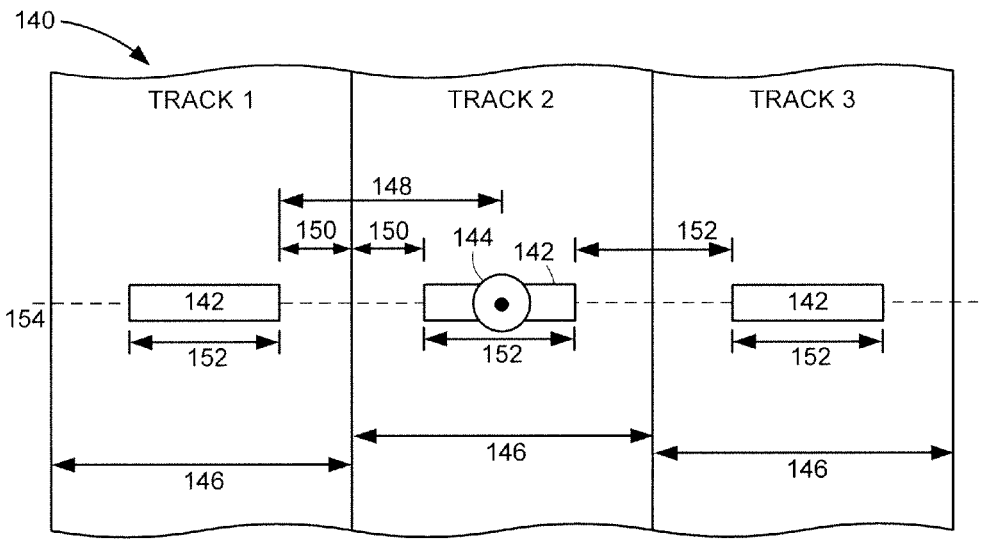
FIG. 3 shows an example block representation of a portion of an example data sensor capable of being used in the data storage device of FIG. 1.

FIG. 3 shows a top view block representation of a portion of a data element 140 capable of being used in the data storage device of FIG. 1 to provide two dimensional data access. The data element 140 has a plurality of read sensors 142 positioned symmetrically about a pivot point 144 that serves as the center of rotation for the data element 140. Such a read sensor 142 configuration about a centralized pivot point 144 can allow for simultaneous active use of each read sensor 142 to concurrent access to data bits on different data tracks that can be processed to increase readback datarate.

The symmetric orientation of the read sensors 142 about the pivot point 144 can allow for a variety of non-limiting configurations to accommodate concurrent access to multiple data tracks regardless of the data track pitch 146. Various embodiments configure the distance 148 between the distal read sensors 142 and the pivot point as the same as the data track pitch 146 while some embodiments position each read sensor 142 approximately half of the track pitch 146 away from the laterally adjacent senor, which corresponds to distance 150 from each read sensor 142 to the edge of the track pitch 146 as approximately one quarter of the track pitch 146. Other embodiments can further configure some or all of the read sensors 142 with a longitudinal length 152 that is approximately half the track pitch 146.

The position of the read sensors 142 in relation to the pivot point 144 can allow each sensor 142 to access only one data track irrespective of skew angle due to the amount of lateral tolerance along the common axis 154 for each sensor 142 to travel before encroaching on an adjacent data track. While configuring a data element 140 with multiple read sensors 142 aligned with different data tracks can be straightforward, practical construction of such an element 140 can be riddled with difficulties stemming at least in part from the precise size and position of each read sensor in relation to micron scale data tracks. Of particular difficulty is the construction and operation of electrical interconnections for the multiple read sensors 142. That is, electrically isolating connections to each read sensor 142 can greatly increase manufacturing time and cost while decreasing read sensor reliability.

Figure 4:
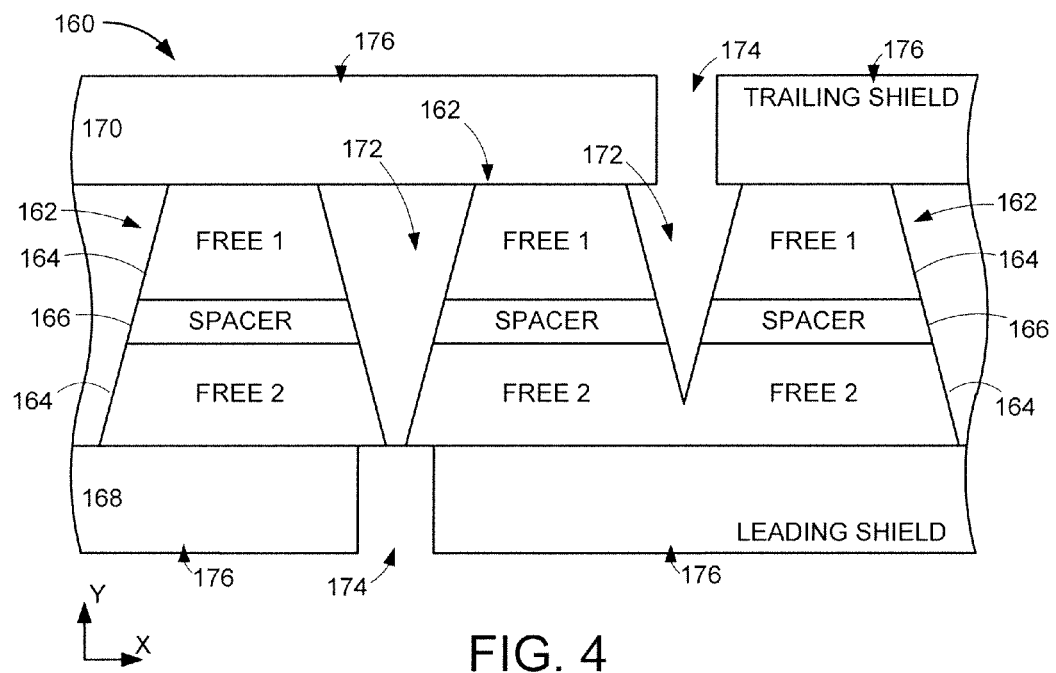
FIG. 4 displays a block representation of a portion of an example read sensor constructed in accordance with various embodiments.

Accordingly, a data reader can be constructed like the example magnetic element 160 of FIG. 4 to provide precise alignment and electrical isolation of multiple magnetic stacks 162 without unduly increasing manufacturing time or cost. As shown in FIG. 4, a plurality of magnetic stacks 162 can respectively be configured as "trilayer" sensors that have first and second magnetically free layers 164 separated by a nonmagnetic spacer layer 166. Such a trilayer sensor configuration can allow decreased spacing between leading 168 and trailing 170 shields as no fixed magnetic layers or structure are directly coupled to the magnetic stacks 162.

While alignment of separate magnetic stacks 162 along a common lateral plane may be difficult, especially in reduced form factor environments, the magnetic element 160 circumvents alignment of the magnetic stacks 162 by forming a single elongated lamination that is subsequently partitioned into the respective magnetic stacks 162 by trenches 172. The size, position, and manner of forming the trenches 172 are not limited and can be configured to accommodate any number of magnetic stacks 162 with limited, or complete, physical isolation from adjacent stacks 162. In the embodiment shown in FIG. 4, each trench continuously extends through the nonmagnetic spacer layer 166 and one of the two magnetically free layers 164, leaving a portion of the bottom free layer 164 physically contacting the adjacent magnetic stack 162.

Such physical contact can provide reliable alignment between the magnetic stacks 162 without affecting independent magnetic operation of the connected free layers 166. The lateral alignment of the magnetic stacks 162 provides the opportunity to use common shields 168 and 170, but poses difficulties in electrically isolating the respective magnetic stacks 162. Hence, each shield 168 and 170 is configured with an electrical trench 174 that physically and electrically separates portions of the respective shields 168 and 170 to direct current through the magnetic stacks 162 is a predetermined pattern. For example, the electrical trench 174 can induce a read current to pass through each magnetic stack as if the stacks 162 are connected in series or as if the stacks 162 were connected in parallel.

While the number, size, and fabrication of the electrical trenches 174 are not limited to a particular design, various embodiments form an electrical trench 174 in one, or both, shields 168 and 170 that produces a number of electrical contact portions 176 that is less than the number of magnetic stacks 162. That is, the trailing shield 170 could be left as a single continuous electrical contact directly contacting each magnetic stack 162 or split into two separate electrical contacts by an electrical trench 174. The ability to configure the shields 168 and 170 into varying numbers of electrical contacts 176 with the formation of an electrical trench 174 allows for minimal manufacturing processing to provide independent operation of each magnetic stack 162 due to the plurality of electrical contacts 176.

It can be appreciated that the electrical trench 174 design displayed in FIG. 4 reduces the number of electrical contacts 176 needed to provide independent operation of the three magnetic stacks 162 from 6 to 4. The increased size of the electrical contact portions 176 of the shields 168 and 170 further provide reliable magnetic stack 162 interconnection through relatively simple patterned etching of the trenches 174, as opposed to the more precise sizing of electrical contacts 176 to correspond to each magnetic stack 162.

With such a reduction in the number of electrical contacts 176, independent data bit detection by each magnetic stack 162 may be conducted through subsequent processing, such as by a controller. Some embodiments conduct independent data bit detection with three magnetic stacks as shown in the example schematic diagram of FIG. 5. As shown, a magnetic element 180 can have three magnetic stacks 182, 184, and 186 constructed similar to the structure shown in FIG. 4 with into four separated electrical contacts 188, 190, 192, and 194 formed with the addition of an electrical trench in the leading and trailing shields, respectively.

Various embodiments may introduce bias currents to one or more electrical contacts 188, 190, 192, and 194 as a function of zero-field resistance of each magnetic stack 182, 184, and 186. Current at the respective electrical contacts can then be a function of the combined bias currents. For example, the current at the second magnetic stack 184 can be the aggregate bias current from contacts 190 and 192 while the current at the first magnetic stack 182 is merely the bias current from contact 188. Such biasing can allow for the voltage changes in the respective magnetic stacks to be independently detected through the difference in voltages between electrical contacts, such as the difference in voltage between contacts 190 and 192 providing the data signal exclusively from the second magnetic stack 184.

However, electrical isolation of magnetic stacks does not necessarily have to correspond to physical separation of magnetic layers. FIG. 6 illustrates an example magnetic element 200 configured to provide multiple independent data signals despite having a single continuous magnetic lamination 202. The lamination 202 can be configured as a trilayer read sensor, as shown, or as any type of magnetoresistive lamination capable of detecting magnetic bits. The trilayer design of FIG. 6 has magnetically sensitive free layers 204 separated by a non-magnetic spacer layer 206.

The lack of physical separation of the magnetic lamination 202 does not mean different portions of the free layers 204 can't have different magnetic orientations, such as orientations corresponding to data bits of different data tracks. Hence, positioning the magnetic lamination 202 across multiple data tracks can provide multiple data bit signals concurrently obtained through a plurality of electrical contacts 208 created by physically separating at least one shield 210 with a trench 212.

The separation of only one of the two magnetic shields 210 and 214 can avoid difficulties of aligning and separating multiple magnetic stacks while providing efficient signal processing of multiple signals through parallel current differentiation. It should be noted that various embodiments form a trench 212 in both shields 210 and 214 so that the magnetic lamination 202 is contacted with a number of electrical contacts 208 that is different than the number of physically separate magnetic stacks.

With the formation of the trench 212, various embodiments further shape the trench sidewalls 216, which can tune the electrical isolation and simultaneous operation of the magnetic stacks. The trench sidewalls 216 are not limited to particular shapes, but can be orthogonal, non-orthogonally linear, or curvilinear in accordance with some embodiments.

Figure 7:
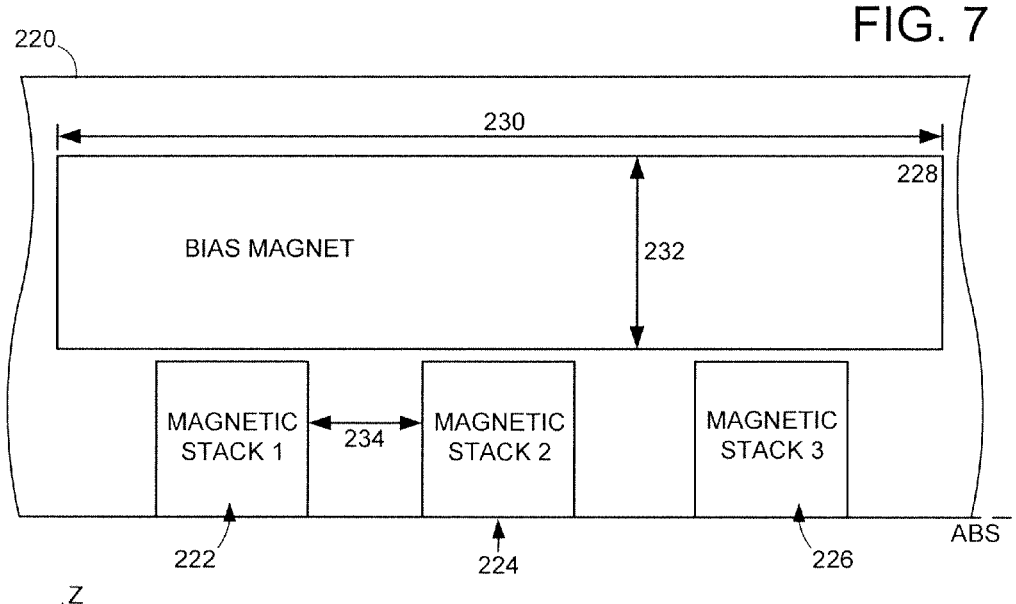
FIG. 7 displays a schematic diagram of an example data read sensor constructed and operated in accordance with various embodiments.

Turning to FIG. 7, a block representation of a top view of an example magnetic element 220 is displayed in accordance with various embodiments. The element 220 is configured with three magnetic stacks 222, 224, and 226 each, at least partially, physically separated and disposed between a bias magnet 228 and an air bearing surface (ABS). The bias magnet 228 can be configured as one, or many, components that induce a default magnetization in each magnetic stacks 222, 224, and 226 by providing predetermined amounts of magnetic flux.

While the bias magnet 228 can be segmented into separate portions, formation of a continuous bias magnet that continuously extends for a bias width 230 across the magnetic element 220 and a bias length 232 behind the magnetic stacks 222, 224, and 226 can provide a more uniform application of bias magnetization than if separate magnets were used for the respective stacks. The separation gap 234 between magnetic stacks 222, 224, and 226 can correspond to the shape and size of an isolation trench, such as trench 172 of FIG. 4.

Figure 8:
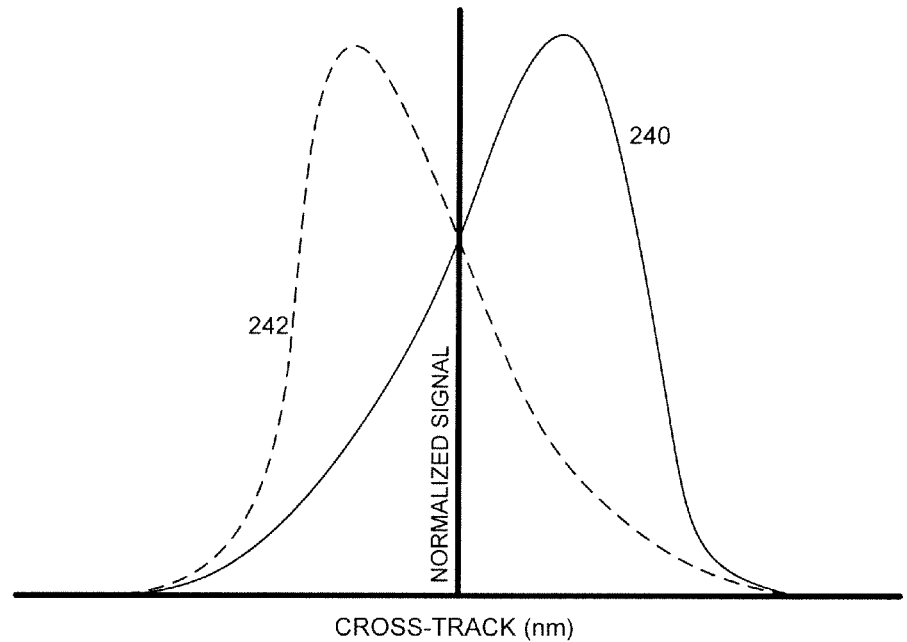
FIG. 8 graphs performance data from an example two dimensional data senor.

In some embodiments, the separation gap 234 is tuned to provide predetermined data signal response. That is, current can flow through electrical contacts in a manner that changes depending on the size of the separation gap 234. With that tuned separation gap 234 in mind, FIG. 8 graphs example data signal strength corresponding to a 36 nm separation gap with respect to the cross-track position of the separate magnetic stacks or continuous magnetic lamination. Solid line 240 and segmented line 242 respectively illustrate how the size of a trench separating electrical contacts can determine the cross-track resolution of the plurality of magnetic sensors, regardless of whether those sensors are physically separated or not.

Figure 9:
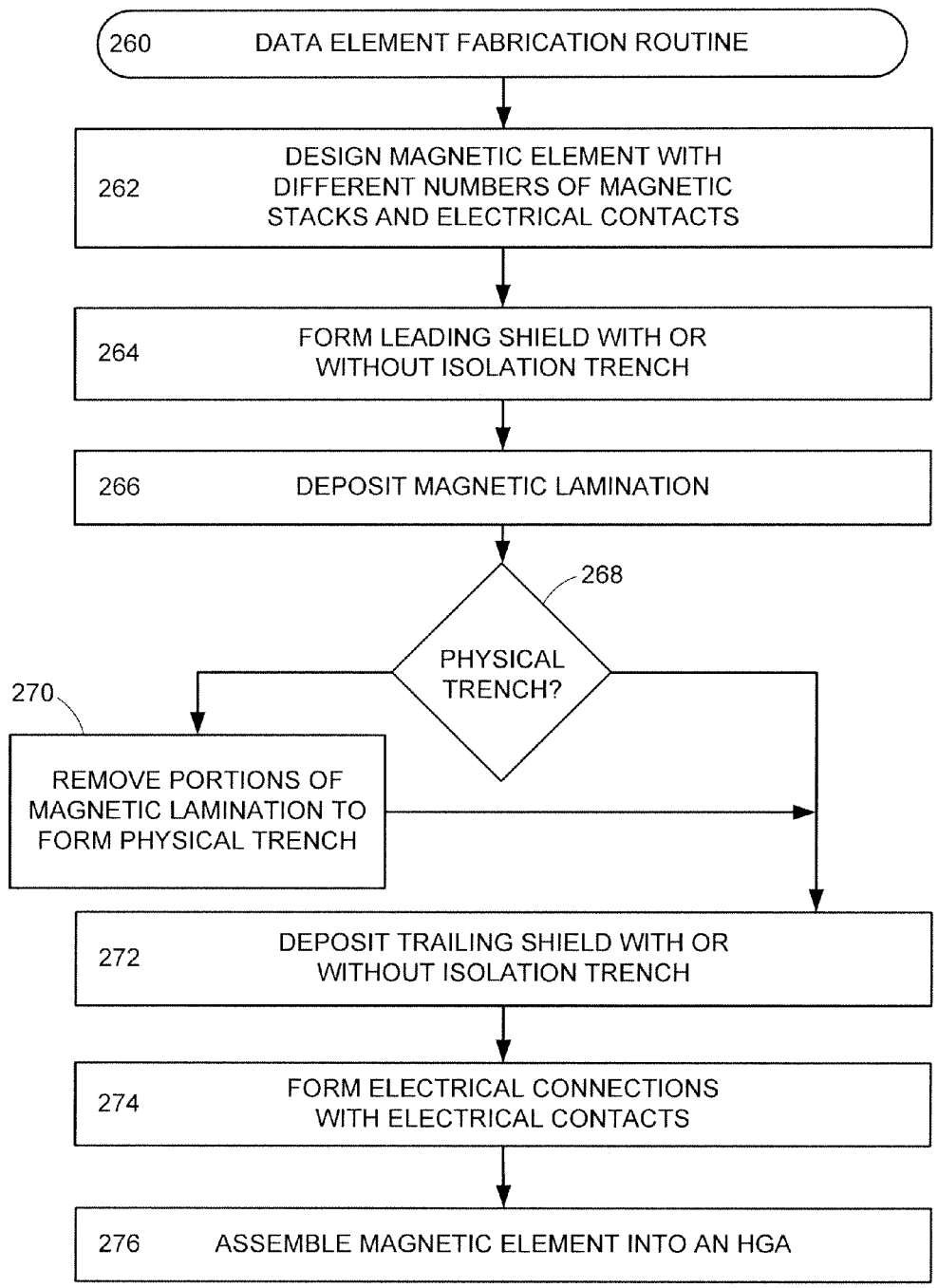
FIG. 9 is a flowchart of a read sensor fabrication routine conducted in accordance with various embodiments.

FIG. 9 provides an example data element fabrication routine 260 performed in accordance with various embodiments. Initially, routine 260 designs a magnetic element with a number of magnetic stacks and a different number of electrical contacts in step 262. As shown in FIGS. 4 and 6, the number of electrical contacts can be less than or greater than the number of electrically or physically separated magnetic stacks.

The number of magnetic stacks and electrical contacts from step 262 leads to step 264 where a leading shield is formed into a single electrical contact with no trench or more than one electrical contact with the formation of a trench having angled or orthogonal trench sidewalls. Step 266 next deposits a magnetic lamination, such as a trilayer lamination, in alignment with the one or more electrical contacts of the leading shield. Decision 268 then determines if the magnetic lamination is to be physically separated or merely electrically separated into magnetic stacks. While not required, decision 268 can further determine if a physical trench is to extend through some or all of the layers of the magnetic lamination.

If a trench is to physically separate the magnetic lamination into separate magnetic stacks, step 270 removes portions of the magnetic lamination to form a trench with shaped sidewalls having rectangular, angular, or curvilinear sidewalls. At the conclusion of the physical separation of the magnetic lamination, or in the event no trench is to be formed from decision 268, step 272 subsequently deposits a trailing shield that is alignment with the magnetic stacks either as a single electrical contact, or as multiple electrical contacts formed with the removal of trailing shield material in the form of a trench having rectangular, angled, or curvilinear sidewalls.

With different numbers of electrical contacts and magnetic stacks being present at the end of step 272, step 274 can then form electrical interconnections between the various electrical contacts to allow independent operation of the magnetic stacks. Finally, step 276 assembles the magnetic element having multiple magnetic stacks on a head gimbal assembly (HGA) that can selectively position the magnetic stacks in alignment with adjacent data tracks of a data media to provide two dimensional data sensing.

It can be appreciated that routine 260 can produce a data element with a wide variety of configurations tuned to concurrently read data from different data tracks. However, the routine 260 is not limiting as the steps and decisions shown in FIG. 9 can be omitted, changed, and added. For example, a bias magnet can be formed proximal the magnetic lamination prior to the formation of the trailing shield in step 272.

The various structural configurations of the magnetic stacks and electrical contacts of the data element described in the present disclosure allows for at least two dimensional magnetic reading and adjacent track interference cancellation due to simultaneous reading of data bits from different data tracks. Moreover, the ability to tune the number of electrical contacts and magnetic stacks allows for efficient manufacturing and element operation corresponding to chosen environmental conditions, such as data track pitch and data transfer rates. Additionally, while the embodiments have been directed to magnetic sensing, it will be appreciated that the claimed technology can readily be utilized in any number of other applications, such as data programming.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a number of magnetic stacks respectively configured to engage adjacent data tracks of a data storage media, each magnetic stack disposed between leading and trailing shields, each shield segmented into a number of contacts different than the number of magnetic stacks, each contact electrically separated by a trench having non-parallel sidewalls to allow two dimensional data sensing.

2. The apparatus of claim 1, wherein the number of magnetic stacks is less than the number of electrical contacts.

3. The apparatus of claim 1, wherein the number of magnetic stacks is greater than a number of electrical trenches.

4. The apparatus of claim 1, wherein each magnetic stack is a trilayer sensor comprising multiple magnetically free layers without a fixed magnetic reference structure.

5. The apparatus of claim 1, wherein at least one of the leading and trailing shields continuously extends across at least two magnetic stacks of the number of magnetic stacks.

6. The apparatus of claim 1, wherein each trench is positioned on an air bearing surface (ABS).

7. The apparatus of claim 6, wherein at least one trench has sidewalls shaped to meet at a point.

8. The apparatus of claim 6, wherein the number of contacts are physically separated by at least one electrical trench, each electrical trench having parallel sidewalls.

9. The apparatus of claim 1, wherein at least one electrical contact spans multiple magnetic stacks.

10. The apparatus of claim 1, wherein each magnetic stack is positioned on an air bearing surface (ABS).

11. A magnetic element comprising a number of magnetic stacks different than a number of electrical contacts, at least two magnetic stacks of the number of magnetic stacks defined by at least one trench extending through less than all of a plurality of layers of the magnetic stacks, the electrical contacts segmented from each of a first shield and a second shield positioned adjacent the number of magnetic stacks.

12. The magnetic element of claim 11, wherein a bias magnet continuously extends across each magnetic stack, opposite an air bearing surface (ABS).

13. The magnetic element of claim 11, wherein at least one electrical contact is sized to span a single magnetic stack.

14. The magnetic element of claim 11, wherein the number of magnetic stacks are formed from a single continuous magnetic lamination.

15. The magnetic element of claim 11, wherein each magnetic stack is positioned to simultaneously access user data from adjacent data tracks on an adjacent data storage media.

16. The magnetic element of claim 11, wherein the number of magnetic stacks are configured for two dimensional data sensing.

17. The magnetic element of claim 11, wherein a first magnetic stack of the number of magnetic stacks is physically separated from an adjacent magnetic stack by a first trench and from a second magnetic stack of the number of magnetic stack by a second trench, the first and second trenches having different depths as measured between the first and second shields.

18. The magnetic element of claim 17, wherein the first trench extending through some, but not all the plurality of layers and the second trench extending through each of the plurality of layers.

19. A transducing head comprising:
a number of magnetic stacks disposed between leading and trailing shields on an air bearing surface (ABS), the leading and trailing shields configured into a number of electrical contacts by at least one electrical trench in each shield, the number of magnetic stacks separated by at least one stack trench, the at least one electrical trench having a pair of parallel sidewalls and the at least one stack trench having a pair of non-parallel sidewalls.

* * * * *